United States Patent [19]

Lockwood, Jr.

[11] Patent Number: 4,466,424
[45] Date of Patent: Aug. 21, 1984

[54] SOLAR COLLECTOR SYSTEM FOR STANDING SEAM ROOFS

[76] Inventor: C. W. Lockwood, Jr., P.O. Box 549, Hampton, Va. 23669

[21] Appl. No.: 329,655

[22] Filed: Dec. 11, 1981

[51] Int. Cl.³ .............................................. F24J 3/02
[52] U.S. Cl. .................... 126/452; 126/449; 126/450; 52/173 R
[58] Field of Search ............... 126/429, 431, 449, 450, 126/428, 432; 52/90, 94, 173 R, 528

[56] References Cited

U.S. PATENT DOCUMENTS

| | | | |
|---|---|---|---|
| 4,108,155 | 8/1978 | Koizumi et al. | 126/429 |
| 4,111,185 | 9/1978 | Swann | 126/400 X |
| 4,120,286 | 10/1978 | Farber | |
| 4,137,097 | 1/1979 | Kelly | |
| 4,144,874 | 3/1979 | Zebuhr | 126/450 X |
| 4,169,459 | 10/1979 | Ehrlich | |
| 4,178,912 | 12/1979 | Felter | 126/431 X |
| 4,198,955 | 4/1980 | Dorbeck | |
| 4,221,208 | 9/1980 | Murphy, Jr. | |
| 4,280,484 | 7/1981 | Mancosu | 126/450 |
| 4,309,988 | 1/1982 | Riley | 126/450 |
| 4,371,031 | 2/1983 | Bernander et al. | 126/429 X |

FOREIGN PATENT DOCUMENTS 2475197 8/1981 France ................. 126/450

Primary Examiner—Samuel Scott
Assistant Examiner—Margaret A. Focarino
Attorney, Agent, or Firm—Banner, Birch, McKie & Beckett

[57] ABSTRACT

A solar collector system for standing seam roofs and a method of installing the system is disclosed. The system includes at least one solar collector unit incorporated into a standing seam roof. The collector unit is formed by securing at least one transparent sheet member to longitudinal side walls of a standing seam panel member, closing the ends of the panel member to form a heat exchange chamber between the panel member and the transparent sheet member, and forming an inlet to and an outlet from the heat exchange chamber to pass a heat exchange fluid through the heat exchange chamber.

30 Claims, 4 Drawing Figures

SOLAR COLLECTOR SYSTEM FOR STANDING SEAM ROOFS

TECHNICAL FIELD

The present invention relates broadly to solar collection systems. More particularly, the invention relates to a solar collector system incorporated into a standing seam roof and a method for converting a standing seam roof into a solar collector system-roof.

BACKGROUND OF THE INVENTION

As conventional fuel costs soar, alternative fuel sources are being sought. One such source, solar energy, is becoming increasingly developed because of its cleanliness and abundance. In addition, solar energy can be harnessed for a variety of tasks, including water and space heating. However, one drawback has been the expense of conversion to solar heat as compared to its perceived economic savings.

Many types of solar heating devices have been made to capture the sun's energy. One such device is disclosed in U.S. Pat. No. 4,073,282 to Schriefer. In Schriefer, a solar collector includes a matrix of plural layers of slit-and-expanded sheets to collect and retain the solar heat energy that penetrates through a transparent panel on the front of the collector. Another device is shown in U.S. Pat. No. 4,202,319. The '319 patent discloses a building roof wherein a plurality of tile-like solar heat collectors are mounted on the roof.

Many of the prior art solar collector systems use solar collector units which are discrete from the roof structure itself. Such solar collector units must form the entire heat exchange chamber, i.e., must have an absorbing panel encased by at least one transparent wall and enclosing walls to form a sealed chamber. From a material standpoint, such solar collector units are relatively expensive. When a large number of collector units are required to meet the heating needs of a particular application, the cost of installing a solar heating system with such collector units rises further. The present invention was developed to reduce the cost of converting a building to solar heat by utilizing a portion of the roof structure as part of the solar collector units.

SUMMARY OF THE INVENTION

The present invention is directed to a solar collection system for standing seam roofs. The solar collector system is comprised of at least one solar collector unit made out of at least one standing seam roof panel, and guiding means for guiding an energy absorbing fluid to and from the collector unit.

In a preferred embodiment, a plurality of collector units are used and each solar collector unit is comprised of two standing seam roof panel sections. Each panel section is comprised of a trough-shaped panel member with two opposite ends, longitudinal side walls that are shaped with standing seam elements at their tops and a base extending between the side walls and the opposite ends. A first end is located near the roof's outer perimeter and a second end is located near the roof's edge. Each side wall also contains a shoulder below the seam element. Lateral closure strips fit into and close the lateral ends of each panel member. A transparent sheet member is sealingly secured to the upper portions of each standing seam element of a solar collector unit. This upper sheet member allows solar energy to enter the collector. A lower sheet member is located and sealed to the shoulders below the standing seam elements creating two chambers in the collector. The first chamber, defined by the base of the panel, the longitudinal side walls, the lateral closure strips, and the lower sheet member acts as a heat exchange area where the solar energy is absorbed by the heat absorbing fluid. The second chamber, defined by the lower sheet member, the longitudinal side walls, the lateral closure strips, and the upper sheet member, acts as an insulation area that prevents a substantial portion of the solar energy contained in the solar collector from exiting the collector.

An inlet is located at the first end of the solar collector and is connected to inlet ductwork positioned between the standing seam roof support and the panel member for communication between the ductwork and the heat exchange chamber. An outlet is located in the lateral closure strip at the second end and connects the heat exchange chamber of the solar collector with outlet ductwork positioned adjacent to the second end lateral closure strip. This ductwork is also supported by the standing seam roof support. The heat exchange fluid is preferably ambient air from the building enclosed by the roof which is drawn into the collector through the inlet ductwork and returned in a heated condition to the building. Alternatively, other heat exchange fluids, such as water, can be used. Conventional temperature controls can be used to assure that the fluid passes through the collectors only during appropriate temperature conditions.

The present invention enables a solar collection system to be incorporated into a standing seam roof in an inexpensive, easy to install, and efficient manner. The collector system requires little material and is suited perfectly for the shape of standing seam roofs. Rather than requiring the purchase and installation of separate, complete solar collector units, the present invention utilizes portions of the standing seam roof in the construction of the solar collector units. Material and labor costs are considerably reduced.

Various advantages and features of novelty that characterize the invention are pointed out with particularity in the claims annexed hereto and forming a part hereof. However, for a better understanding of the invention, its advantages and objects obtained by its use, reference should be had to the drawings which form a further part hereof, and the accompanying descriptive matter in which there is illustrated and described an embodiment of the invention.

BRIEF DESCRIPTION OF THE DRAWINGS

FIG. 4 is a partial perspective view of a building covered with a standing seam roof and having a plurality of solar collector units incorporated into the roof.

DETAILED DESCRIPTION OF THE INVENTION

Figure 1:
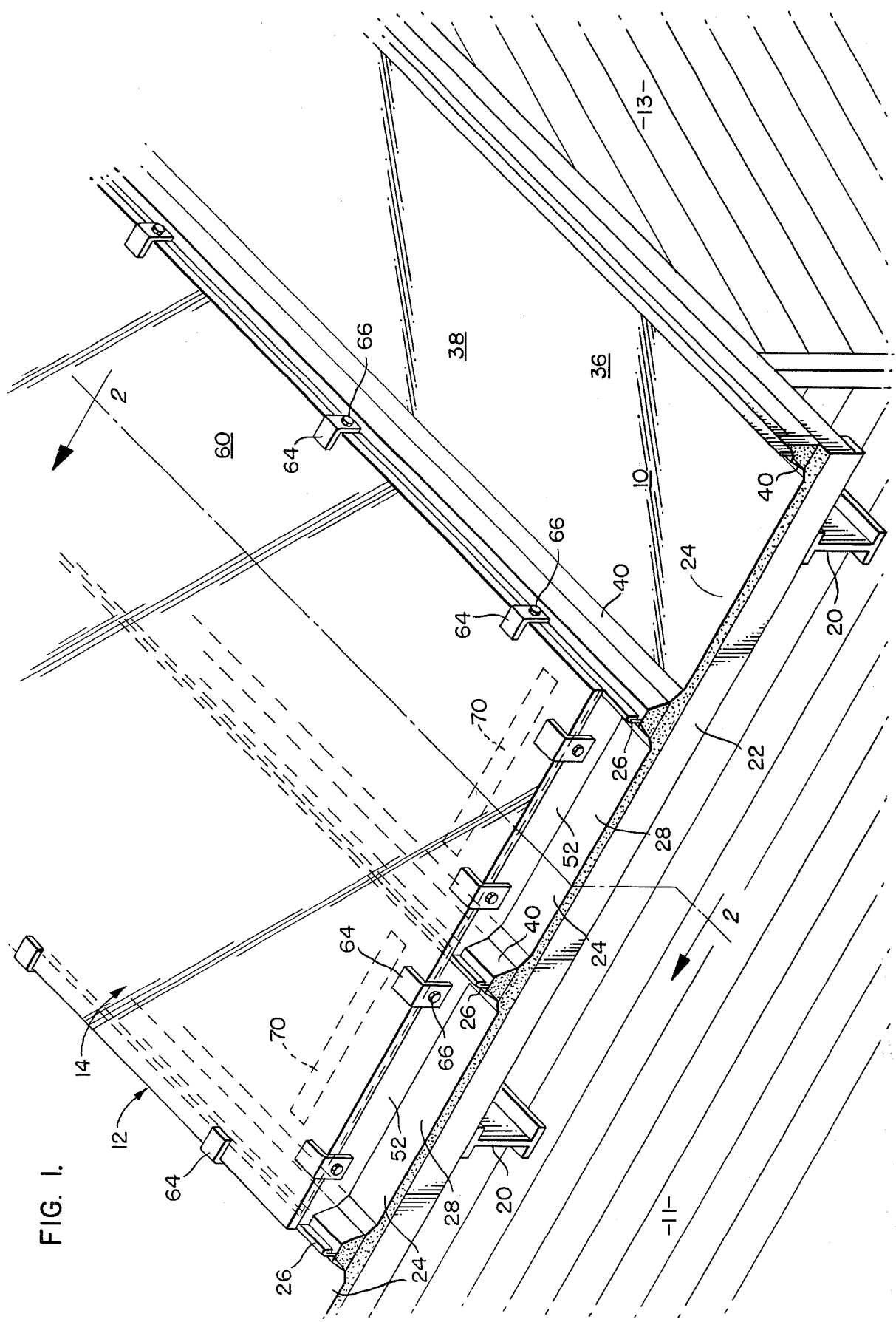
FIG. 1 is a partial perspective view illustrating a portion of a solar collector unit in accordance with the present invention.

Referring to the drawings in detail wherein like numerals indicate like elements, there is shown in the Figures a standing seam roof 10 supported above walls 11, 13 of a building. A solar collector system 12 is incorporated into the standing seam roof 10. In the illustrated embodiment, the solar collector system 12 is made up of solar collectors 14 and guiding means 16 for directing a heat exchange fluid through collectors 14.

Figure 2:
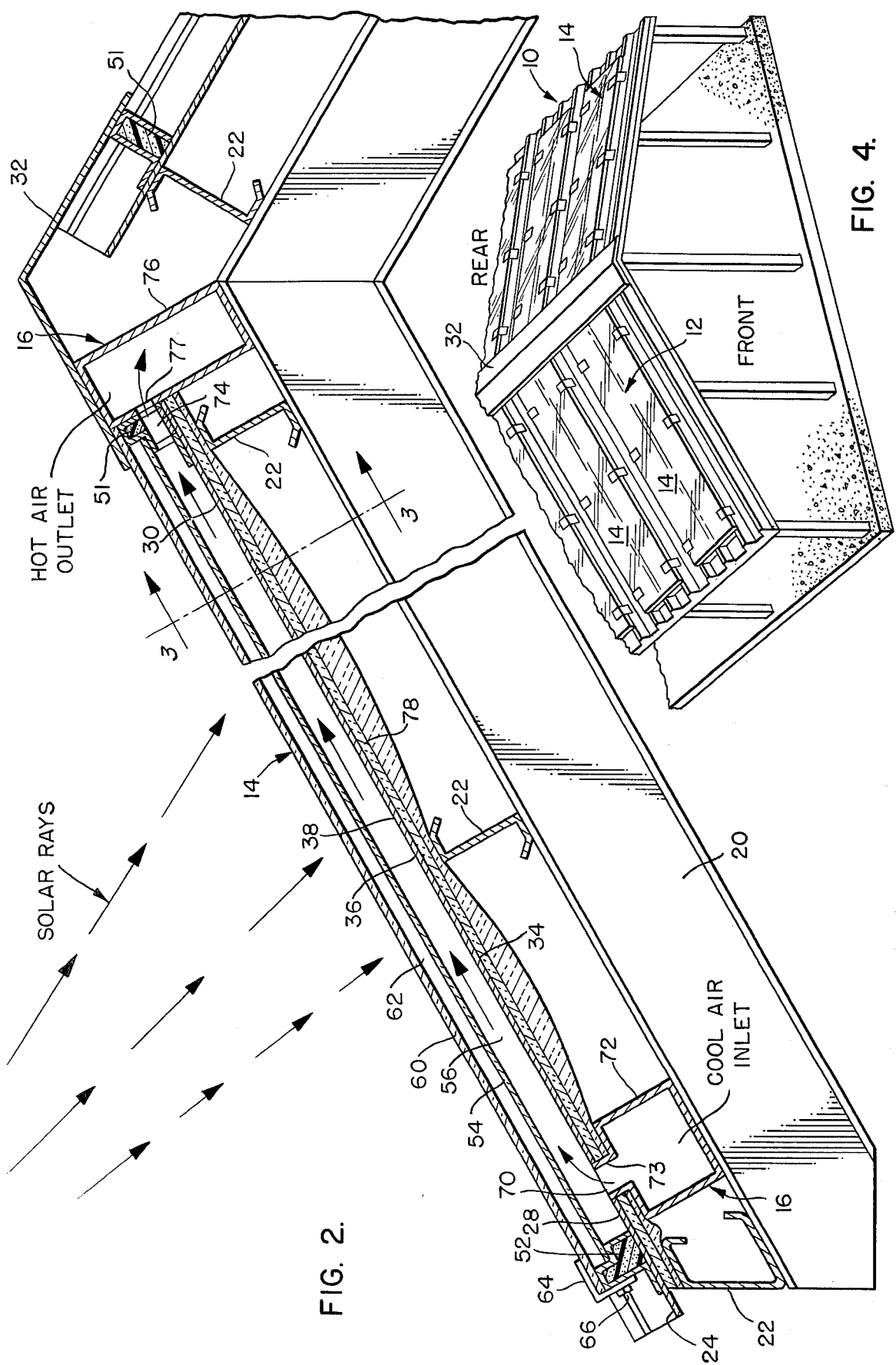
FIG. 2 is a sectional view taken generally along line 2—2 of FIG. 1.

The standing seam roof 10 is mounted on a roof support, including rigid support beams 20 extending from side wall 11 to a central peak of roof 10 and purlins 22 extending between beams 20. Standing seam roof 10 is made up of a number of interlocked standing seam panels 24 joined at standing seams 26. As seen in FIG. 2, each standing seam panel 24 has a lower first end 28 located near the outer perimeter of the roof 10 and an upper second end 30 located near the center ridge 32 of roof 10. Each standing seam panel 24 has an inner surface 34 facing inward toward the interior of the building, an outer surface 36 facing outward, and a center or base portion 38 with a side wall 40 extending upward from either side of base portion 38. A longitudinal shoulder 42 is formed in each side wall below the uppermost extent of the wall 40. Each panel 24 contains a male seam element 44 along the uppermost extent of one side wall 40 and a female seam element 46 along the uppermost extent of the other side wall 40.

Figure 3:
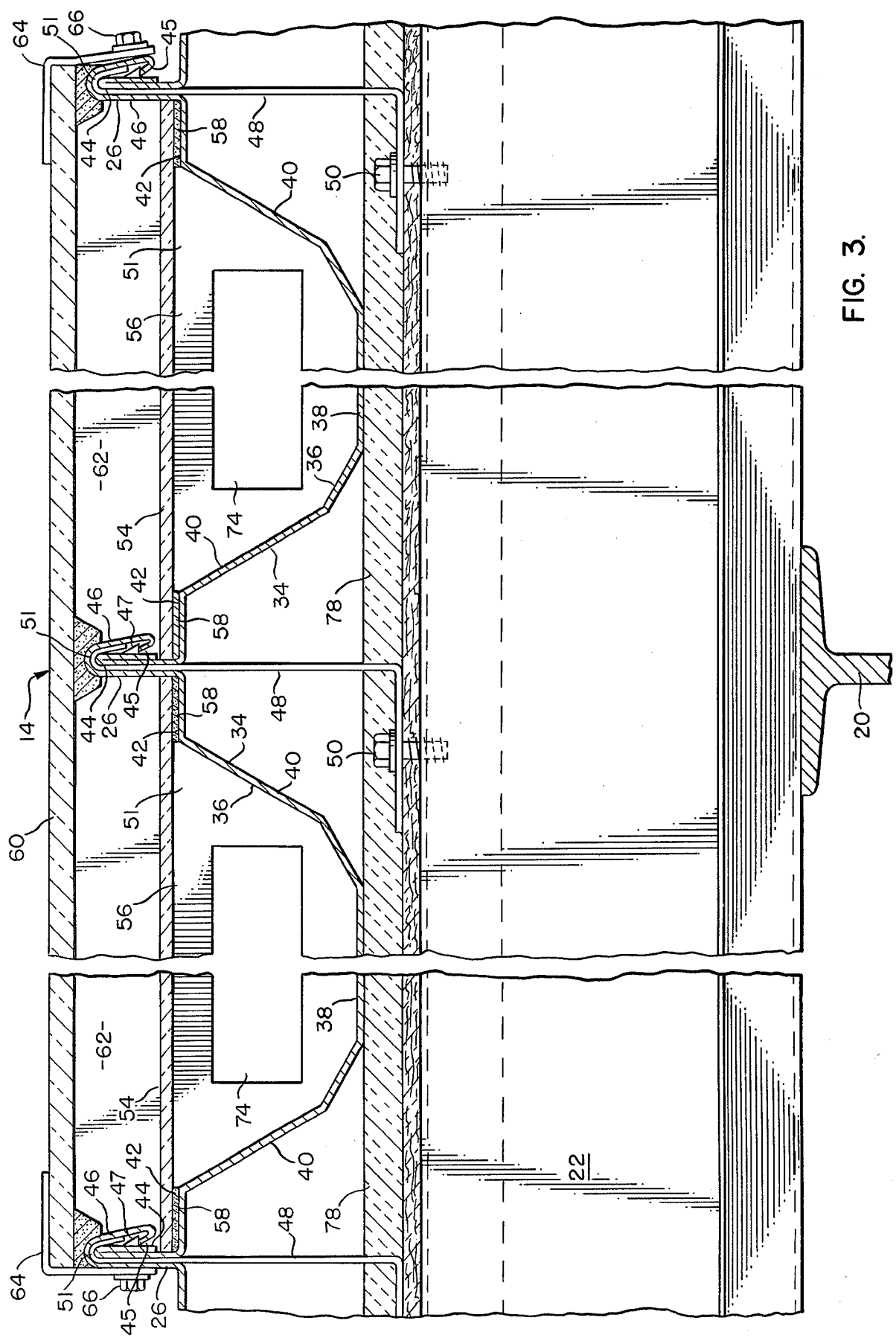
FIG. 3 is a sectional view taken generally along line 3—3 of FIG. 2.

The manner of attaching the panels 24 to the roof is best seen in FIG. 3. Mounting brackets 48 are attached to purlins 22 by metal screws 50. Each bracket 48 has an upper female lip 51 within which a male seam element 44 is held. The female seam element 46 of an adjacent panel member 24 is then placed over the top of both the female lip 81 of mounting bracket 48 and the male seam element 44. A locking tab 47 of the male seam element 44 fits over an upturned locking lip 45 of the female seam element 46.

The standing seam roof panels 24 are converted into a solar collectors 14 in the following manner. Upper and lower lateral closure strips 51, 52 are placed into the upper and lower ends 30, 28 of the panels 24. The closure strips 51, 52 are shaped to mate with the lateral cross-section of the panel 24 so that a snug fit is obtained. A lower transparent sheet of material 54, such as glass or plastic, is placed on top of the side wall shoulders 42 and abuts with the lateral closure strips 51, 52 to create a first chamber 56. Chamber 56 is sealed by the application of sealant 58 such as mastic tape or caulking to all contacting surfaces. An upper sheet of transparent material 60 is placed on the top of standing seams 26 and spans the width of two roof panels 24. The placement of sheet 60 creates a second chamber 62 which is also preferably sealed by the use of a sealant 58 at all contacting surfaces.

The upper sheet of material 60 is secured to the roof panel 24 by fastening mounting brackets 64 to the standing seams 26 and to the lateral closure strips 51, 52 with screws 66. Mounting brackets 64 are angled so that when attached to seams 26 and closure strips 51, 52, they have a portion which extends over the surface of the sheet material 60 to hold it in place. Chamber 56 functions as a heat exchange chamber and chamber 62 functions as an insulating chamber to increase the heat retention within heat exchange chamber 56. The panel 24 functions as a solar heat absorption plate. To increase the solar energy collection capacity of panel 24 within chamber 56, its outer surface 36 can be painted black.

As seen in FIG. 2, an inlet 70 is located at the lower end 28 of the panel 24. The inlet 70 is an aperture formed in the base 38 of panel 24 adjacent to lower end 28 to allow communication between the collector 14 and the fluid guiding means 16. Guiding means 16 includes inlet ductwork 72 supported by the rigid support beams 20. Ductwork 72 abuts the panel 24 at the inner surface 30 of the lower end 28 and has an inlet extension 73 which extends into outlet aperture 70.

An outlet 74 is formed in the upper lateral closure strip 51. The outlet 74 is an aperture located in the closure strip 51 to allow communication between the collector 14 and the fluid guiding means 16. Alternatively, the outlet aperture can be formed through panel 24 adjacent its upper end 30. Guiding means 16 includes outlet ductwork 76 which is supported by the rigid support beam 20. Ductwork 76 abuts the upper lateral closure strip 51 and communicates with heat exchange chamber 56 through an outlet hole 77 of ductwork 76. Alternatively, ductwork 76 can be placed below panel 24 and communicates with chamber 56 through base portion 38 in the manner of ductwork 72, as shown in dashed line in FIG. 2. Insulation material 78 is placed on the inner surface 34 of the panel 24 to retain heat energy captured by the collector 14.

While FIG. 1 illustrates only a singular solar collector 14, system 12 is preferably formed of a plurality of collectors 14, as shown in FIG. 4. In such an instance, the collectors 14 are spaced by one or more panels not converted into solar collectors. The collectors 14 are connected in fluid communication with one another by inlet and outlet ductwork 72, 76. Also, while transparent sheet 60 is shown spanning two panels, a solar collector can be formed by having sheet 60 extend over only one panel 24. Finally, while the preferred embodiment utilizes a heat exchange chamber and an insulating chamber, a collector can be formed of only one chamber, i.e., a heat exchange chamber, by placing only one of the sheet members 54, 60 on a panel 24. However, such a single-chamber collector would be less efficient.

In operation, cool air to be heated is pumped, by any conventional pump or fan device, into and through inlet ductwork 72 until it reaches the inlet 70 of a solar collector 14. The air then travels into the heat exchange chamber 56 defined by the upper surface of the panel member 34, the two longitudinal side walls 40, the upper and lower closure strips 51, 52, and the first transparent sheet 54. Chamber 56 acts as the heat exchange chamber where sunlight admitted by sheet members 54 and 60 heats the panel 24 and the air contained in chamber 56. This heat energy is absorbed by the air passing through the chamber 56. After the air has passed through chamber 56 is exits through the outlet 74 into the outlet ductwork 76 for travel back to the area where the heated air is desired. While the heat exchange fluid in the preferred embodiment is air, other heat exchange fluids, such as water, could also be used.

Numerous characteristics and advantages of the invention have been set forth in the foregoing description together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. A solar collector system incorporated into a standing seam roof comprising:

at least one solar collector unit, and guiding means for guiding an energy absorbing fluid to and from said at least one collector unit, said collector unit including a transparent upper sheet member for allowing solar energy to enter said collector unit, and at least one panel section of a standing seam roof, said panel section comprising a trough-shaped panel member having a center portion, two opposite ends and longitudinal sides walls extending upward from said center portion, a first of said opposite ends being located toward an outer perimeter of the standing seam roof and a second of said opposite ends being located towards a center ridge thereof, said side walls terminating in a standing seam element extending upward from said center portion for interlocking fit with another upwardly extending standing seam element of an adjacent panel member, said sheet member longitudinally resting upon and supported by upper portions of at least two of said side walls and being sealingly secured thereto; and lateral closure means for closing said first and second ends of said panel member, said closure means forming a seal with said panel member and said sheet member to form a sealed heat exchange chamber, said sealed heat exchange chamber being enclosed by said center portion and said longitudinal side walls of said panel member, said lateral closure means, and said sheet member, said heat exchange chamber including inlet and outlet means for communication between said chamber and said guiding means for passing the energy absorbing fluid through said sealed chamber.

2. A solar collector system incorporated into a standing seam roof comprising:

a plurality of solar collector units and guiding means for guiding an energy absorbing fluid to and from said collector units;

each of said collector units including at least one panel section of a standing seam roof, upper and lower transparent sheet members, and closure means for closing a first and second end of said panel section;

each of said panel sections comprising a trough-shaped panel member having two opposite ends, longitudinal sides walls and a base extending between said side walls and said ends, a first of said opposite ends being located adjacent an outer perimeter of the standing seam roof, and a second of said opposite ends being located adjacent a center ridge of the roof, said side walls being shaped at their upper edges to form a standing seam element for interlocking fit with another standing seam element of an adjacent panel member and having a shoulder located below said standing seam element;

said upper transparent sheet member being supported by and attached to at least two of said standing seams elements and said lower transparent sheet being supported by, attached and sealed to a pair of said shoulders, said closure means including a first closure strip at the first end of said panel member contacting and forming a seal with said panel member and said upper and lower sheets and a second closure strip at the second end of said panel member contacting and forming a seal with said panel member and said upper and lower sheets whereby a sealed heat exchange chamber is formed between said trough-shaped panel member, said first and second closure strips and said lower sheet member, and an insulating chamber is formed between said upper and lower sheet members, said first and second closure strips and said longitudinal walls of said panel member;

an inlet aperture formed into said heat exchange chamber adjacent one of the opposite ends of said panel member and an outlet aperture formed into said heat exchange chamber adjacent the other of said opposite ends of said panel member; and said guiding means including an inlet duct extending between said solar collector units in fluid communication with said inlet aperture and an outlet duct extending between and in fluid communication with said outlet apertures of said solar collector units.

3. A method for incorporating a solar heat collection system into a standing seam roof, the roof having a plurality of trough-shaped panel members with two opposite ends, a pair of upwardly extending longitudinal side walls and a base extending between the side walls, a first of said ends being located towards the outer perimeter of the standing seam roof, and a second of said ends being located towards a center ridge of the roof, each of said side walls terminating in a standing seam element extending upward from said base for interlocking fit with another upwardly extending standing seam element of an adjacent panel member, the plurality of members resting on a roof support, comprising the steps of:

(a) placing lateral closures at the first and second ends of at least one of the panel members of the standing seam roof to form a lateral wall member at either of said ends;

(b) placing a transparent sheet member on at least one of said panel members of the standing seam roof so that said sheet member extends between the longitudinal side walls and lateral closures of at least one of said panel members to form a chamber therebetween;

(c) securing said sheet member to said panel member;

(d) sealing said sheet member to said longitudinal walls of said panel member and said lateral closures to seal said chamber, whereby said chamber forms a heat exchange chamber;

(e) forming an inlet to said heat exchange chamber for the entry of an energy absorbing fluid;

(f) forming an outlet from said heat exchange chamber for the exit of the energy absorbing fluid;

(g) installing a guide means for guiding the energy absorbing fluid to and from said heat exchange chamber and through the solar collection system.

4. A method in accordance with claim 3 wherein said transparent sheet member is placed on top of the standing seam elements of said at least one of said panel members.

5. A method in accordance with claim 3 wherein the step of installing said fluid guiding means includes:

positioning inlet ductwork adjacent to and laterally underneath said panel member adjacent the inlet to said heat exchange chamber, and connecting said ductwork in fluid communication with said heat exchange chamber through said inlet.

6. A method in accordance with claim 5 wherein the step of installing said fluid guiding means includes positioning outlet ductwork adjacent to said second end of said panel member, and connecting said ductwork in fluid communication with said first heat exchange chamber through said outlet.

7. A method in accordance with claim 3 including the step of covering the lower face of the base said panel member with insulation material to increase energy retaining capability of said heat exchange chamber.

8. A solar collector system incorporated into a standing seam roof comprising:

at least one solar collector unit, and guiding means for guiding an energy absorbing fluid to and from said at least one collector unit, said collector unit including upper and lower transparent sheet members for allowing solar energy to enter said collector unit, and at least one panel section of a standing seam roof, said panel section comprising a trough-shaped panel member having a center portion, two opposite ends and longitudinal sides walls extending upward from said center portion, a first of said opposite ends being located toward an outer perimeter of the standing seam roof and a second of said opposite ends being located towards a center ridge thereof, said side walls being shaped at their upper edges to form a standing seam element for interlocking fit with another standing seam element of an adjacent panel member, each of said longitudinal side walls containing a shoulder below an outer edge of said standing seam element, said upper sheet member longitudinally resting upon and supported by upper portions of at least two of said side walls and being sealingly secured thereto and said lower transparent sheet member being supported and sealingly secured to said shoulders;

lateral closure means for closing said first and second ends of said panel members, said upper and lower sheet members being laterally sealed by said lateral closure means to form two sealed chambers, a first of said sealed chambers being a heat exchange chamber enclosed by said trough-shaped panel member, said lateral closure means and said lower sheet member, and a second of said sealed chambers being an insulation chamber enclosed by said panel longitudinal side walls, said lateral closure means, said upper sheet member and said lower sheet member, said first chamber including an inlet and outlet means for communication between said first chamber and said guiding means for passing said energy absorbing fluid through said first chamber.

9. A solar collector system in accordance with claim 1 or 8 wherein said inlet means comprises an inlet aperture formed at said first end of said panel member for allowing said guiding means to communicate with said heat exchange chamber.

10. A solar collector in accordance with claim 9 wherein said inlet aperture is formed in a lower surface of said panel.

11. A solar collector system in accordance with claim 9 wherein said outlet means comprises an outlet aperture formed at said second end of said panel member for allowing said guiding means to communicate with said heat exchange chamber.

12. A solar collector system in accordance with claim 11 wherein said outlet aperture is formed in said lateral closure means at said second end of said panel.

13. A solar collector system in accordance with claim 11 wherein said outlet aperture is formed in a lower surface of said panel.

14. A solar collector system in accordance with claim 11 wherein said guiding means includes inlet ductwork positioned adjacent to and laterally underneath said first end of said panel member and connected to said heat exchange chamber through said inlet aperture.

15. A solar collector system in accordance with claim 14 wherein said guiding means includes outlet ductwork positioned adjacent to said second end of said panel member and connected to said heat exchange chamber through said outlet aperture.

16. A solar collector system in accordance with claim 12 wherein said guiding means includes outlet ductwork positioned laterally adjacent to said lateral closure means at the second end of said panel and connected to said heat exchange chamber through said outlet aperture.

17. A solar collector system in accordance with claim 8 wherein said upper sheet member also laterally rests upon and is supported by said lateral closure means at said first and second ends of said panel member, said first and second closure means each comprising a closure strip with the same shape as the lateral shape of said panel section.

18. A solar collector system in accordance with claim 8 wherein said upper sheet member is secured to the upper portions of said standing seams with angled brackets attached to said standing seams and extending over said first sheet member.

19. A solar collector system in accordance with claim 17 wherein said upper sheet member is secured to each lateral closure means by angled brackets attached to each lateral closure means and extending over said upper sheet member.

20. A solar collector system in accordance with claim 1 or 8 wherein said center portion has an upper and lower face, and said lower face being covered by insulation material.

21. A solar collector system in accordance with claim 1 or 8 including a plurality of said solar collector units, adjacent collector units being spaced from one another by at least one of said panel members.

22. A solar collector system incorporated into a standing seam roof comprising:

at least one solar collector unit, and guiding means for guiding an energy absorbing fluid to and from said at least one collector unit, said collector unit including a transparent sheet member for allowing solar energy to enter said collector unit, and at least one panel section of a standing seam roof, said panel section comprising a trough-shaped panel member having two opposite ends and longitudinal sides walls, a first of said opposite ends being located toward an outer perimeter of the standing seam roof and a second of said opposite ends being located towards a center ridge thereof, said side walls being shaped at their upper edges to form a standing seam element for interlocking fit with another standing seam element of an adjacent panel member;

first and second lateral closure means for closing said first and second ends of said panel member, said first and second closure means each comprising a closure strip with the same shape as the lateral shape of said panel section, said closure strips forming a seal with said panel member and said sheet member to form a sealed chamber, said sealed chamber being enclosed by said trough-shaped panel member, said longitudinal side walls, said lateral closure means, and said sheet member, said chamber including inlet and outlet means for communication between said chamber and said guiding means for passing the energy absorbing fluid through said sealed chamber; and said sheet member longitudinally resting upon and supported by upper portions of at least two of said side walls and being sealingly secured thereto, and said sheet member laterally resting upon and supported by said first and second lateral closure means at said first and second ends of said panel member.

23. A solar collector system incorporated into a standing seam roof comprising:

at least one solar collector unit, and guiding means for guiding an energy absorbing fluid to and from said at least one collector unit, said collector unit including a transparent sheet member for allowing solar energy to enter said collector unit, and at least one panel section of a standing seam roof, said panel section comprising a trough-shaped panel member having two opposite ends and longitudinal sides walls, a first of said opposite ends being located toward an outer perimeter of the standing seam roof and a second of said opposite ends being located towards a center ridge thereof, said side walls being shaped at their upper edges to form a standing seam element for interlocking fit with another standing seam element of an adjacent panel member, said sheet member longitudinally resting upon and supported by upper portions of at least two of said side walls and being sealingly secured to the upper portions of said standing seam elements with angled brackets attached to said standing seam elements and extending over said sheet member; and lateral closure means for closing said first and second ends of said panel member, said closure means forming a seal with said panel member and said sheet member to form a sealed chamber, said sealed chamber being enclosed by said trough-shaped panel member, said longitudinal side walls, said lateral closure means, and said sheet member, said chamber including inlet and outlet means for communication between said chamber and said guiding means for passing the energy absorbing fluid through said sealed chamber.

24. A method for incorporating a solar heat collection system into a standing seam roof, the roof having a plurality of trough-shaped panel members with two opposite ends, a pair of longitudinal side walls and a base extending between the side walls, a first of said ends being located towards the outer perimeter of the standing seam roof, and a second of said ends being located towards a center ridge of the roof, each of said side walls being shaped at its upper edge to form a standing seam element for interlocking fit with another standing seam element of an adjacent panel member and including a shoulder located below the standing seam element, the plurality of members resting on a roof support, comprising the steps of:

(a) placing lateral closures at the first and second ends of at least one of the panel members to form a lateral wall member at either of said ends;

(b) placing a lower transparent sheet member on the shoulders of the side walls of at least one of said panel members so that said sheet member extends between the longitudinal side walls and lateral closures of the at least one of said panel members to form a chamber therebetween;

(c) securing said lower sheet member to said panel member;

(d) sealing said lower sheet member to said longitudinal walls of said panel member and said lateral closures to seal said chamber, whereby said chamber forms a heat exchange chamber;

(e) placing an upper transparent sheet member above said lower transparent sheet member;

(f) securing said upper transparent sheet member to said longitudinal side members to create an insulating chamber between said longitudinal side walls, said lateral closures and said upper and lower sheet members;

(g) forming an inlet to said heat exchange chamber for the entry of an energy absorbing fluid;

(h) forming an outlet from said heat exchange chamber for the exit of the energy absorbing fluid; and (i) installing a guide means for guiding the energy absorbing fluid to and from said heat exchange chamber and through the solar collection system.

25. A method in accordance with claim 24 including the step of:

sealing both sheet members to said longitudinal side walls, and said lateral closures.

26. A method in accordance with claim 17, 18 or 24 wherein said step of forming said inlet includes forming an aperture in said first end of said panel member.

27. A method in accordance with claim 26 wherein the steps of forming said outlet includes forming an aperture in one of said panel member and said lateral closure at the second end of said panel member.

28. A method in accordance with claim 24 wherein said step of securing said second sheet member to said panel member includes placing said second sheet member on top of at least two standing seam elements and attaching angled brackets to said standing seam element, and extending one portion of each of said angled brackets over said sheet member.

29. A method for incorporating a solar heat collection system into a standing seam roof, the roof having a plurality of trough-shaped panel members with two opposite ends, a pair of longitudinal side walls and a base extending between the side walls, a first of said ends being located towards the outer perimeter of the standing seam roof, and a second of said ends being located towards a center ridge of the roof, each of said side walls being shaped at its upper edge to form a standing seam element for interlocking fit with another standing seam element of an adjacent panel member, the plurality of members resting on a roof support, comprising the steps of:

(a) placing lateral closures at the first and second ends of at least one of the panel members to form a lateral wall member at either of said ends;

(b) placing a transparent sheet member on at least one of said panel members so that said sheet member extends between the longitudinal side walls and lateral closures of at least one of said panel members to form a chamber therebetween;

(c) securing said sheet member to said panel member by attaching angled brackets to said lateral closures and said longitudinal side walls, and extending one portion of each of said angled brackets over said sheet member;

(d) sealing said sheet member to said longitudinal walls of said panel member and said lateral closures to seal said chamber, whereby said chamber forms a heat exchange chamber;

(e) forming an inlet to said heat exchange chamber for the entry of an energy absorbing fluid;

(f) forming an outlet from said heat exchange chamber for the exit of the energy absorbing fluid;

(g) installing a guide means for guiding the energy absorbing fluid to and from said heat exchange chamber and through the solar collection system.

30. A method in accordance with claim 17 including forming a plurality of said heat exchange chambers by performing steps (a) through (d) on a plurality of said panel members, forming an inlet and an outlet to each of said formed heat exchange chambers by performing steps (e) and (f) on each of said formed heat exchange chambers, and connecting in fluid communication said formed heat exchange chambers with an overall fluid guide means.

* * * * *